United States Patent [19]

Lewis

[11] Patent Number: 5,687,290
[45] Date of Patent: Nov. 11, 1997

[54] METHOD AND APPARATUS FOR MONITORING AND CONTROLLING COMMUNICATIONS NETWORKS

[75] Inventor: Lundy Lewis, Mason, N.H.

[73] Assignee: Cabletron Systems, Inc., Rochester, N.H.

[21] Appl. No.: 722,580

[22] Filed: Oct. 15, 1996

Related U.S. Application Data

[63] Continuation of Ser. No. 124,234, Sep. 20, 1993, abandoned.

[51] Int. Cl.$^6$ .............................. H04L 12/40; G06F 9/44; G05B 13/00
[52] U.S. Cl. .................................. 395/3; 395/61; 395/76; 395/200.01; 395/900
[58] Field of Search ........................... 395/183.02, 76, 395/51, 61, 900, 200.01

[56] References Cited

U.S. PATENT DOCUMENTS

| | | | |
|---|---|---|---|
| 4,864,490 | 9/1989 | Nomoto et al. | 395/61 |
| 5,043,862 | 8/1991 | Takahashi et al. | 364/162 |
| 5,189,728 | 2/1993 | Yamakawa et al. | 395/76 |
| 5,214,576 | 5/1993 | Tani et al. | 364/162 |
| 5,245,528 | 9/1993 | Saito et al. | 364/161 |
| 5,249,269 | 9/1993 | Nakao et al. | 395/200 |
| 5,251,288 | 10/1993 | Nomura et al. | 395/51 |
| 5,253,184 | 10/1993 | Kleinschnitz | 364/550 |
| 5,267,348 | 11/1993 | Someya et al. | 395/61 |
| 5,305,425 | 4/1994 | Ishida et al. | 395/51 |
| 5,311,422 | 5/1994 | Loftin et al. | 364/401 |
| 5,317,725 | 5/1994 | Smith et al. | 395/575 |

FOREIGN PATENT DOCUMENTS

| | | | |
|---|---|---|---|
| 0 398 380A2 | 11/1990 | European Pat. Off. | H04L 12/40 |
| 0 442 809 | 8/1991 | European Pat. Off. | G06F 11/22 |
| 0 508 571 | 10/1992 | European Pat. Off. | G06F 11/22 |
| 3-209944 | 9/1991 | Japan | H04L 12/40 |
| 4-345236 | 12/1992 | Japan . | |
| 4345236 | 12/1992 | Japan | H04L 12/40 |
| 5083268 | 4/1993 | Japan | H04L 12/40 |

OTHER PUBLICATIONS

IEEE Network: The Magazine of Computer Communications, vol. 7, mo. 6, Nov. 1993, New York US pp. 44–51 L. Lewis/G. Dreo; "Extending Trouble Ticket Systems to Fault Diagnostics".

Globecom '90, IEEE Global Telecommunications Conference & Exhibition, May 12, 1990, San Diego, US vol. 2, pp. 1344–1350, IEEE, NY US Y. Lirov et al. "Expert Maintenance Systems in Telecommunications".

(List continued on next page.)

*Primary Examiner*—Robert W. Downs
*Attorney, Agent, or Firm*—Wolf, Greenfield & Sacks, P.C.

[57] ABSTRACT

The apparatus includes a network monitor coupled to the communications network and providing numeric data representative of at least one operating parameter of the communications network. A fuzzifier module is coupled to the network monitor and converts the numeric data into fuzzy input data. A fuzzy inference engine is coupled to the fuzzifier module and processes the fuzzy input data according to at least one fuzzy rule to provide fuzzy output data representative of control actions to effect a desired state of the communications network. A defuzzifier module is coupled to the fuzzy inference engine and converts the fuzzy output data into numeric data which may be then used by a network controller to control at least one network parameter in response to the output data. The apparatus may also include a user interface and a display to allow the fuzzy input data, and the fuzzy output data to be displayed to a user. Using the user interface, the user can then modify the fuzzy input data, the fuzzy output data, and the fuzzy rules. A method for monitoring and controlling communications networks is also disclosed. A methodology for designing membership functions and fuzzy rules useful for monitoring and control of communications networks is disclosed. The system provides for reporting of network behavior in common sense terms, providing recommendations to a user regarding network operational parameters, and, in one embodiment, complete automatic monitoring and control network operational parameters.

18 Claims, 5 Drawing Sheets

OTHER PUBLICATIONS

AT&T Technical Journal, vol. 67, No. 6, Nov. 1988, New York US pp. 137–154, T.E. Marques "Starkeeper Network Troubleshooter; an expert systems product."

International Seach Report for International Patent Application PCT/US 94/02056 filed Feb. 25, 1994.

Chakraborty B., et al., "Fuzzy Technique In Network Management Expert Systems," 2nd International Workshop On Industrial Fuzzy Control And Intelligent Systems, 2 Dec. 1992, College Station, TX, USA, pp. 40–48.

Tanaka Y, et al., "Dynamic Routing By The Use of Hierarchical Fuzzy System," IEICE Transactions, vol. E74, No. 12, Dec. 1991, Tokyo, JP, pp. 4000–4005.

Cronk, R.N. et al. 1988. Rule–Based Expert Systems for Network Management and Operations: An Introduction. In *Expert Systems Application in Integrated Network Management*, ed. Eric. C. Ericson, 94–104. Norwood, MA: Artech House, Inc., 1989; hereinafter cited parenthetically as *Expert Systems*.

Sutter M.T. et al. 1988. Designing Expert Systems for Real–Time Diagnosis of Self–Correcting Networks. (*Expert Systems* 109–117)(1989).

Fault Management Applications. (*Expert Systems* 235–239)(1989).

Pagurek B. et al. 1988. Knowledge Based Fault Location in a Data Communication Network. (*Expert Systems* 240–244)(1989).

Peacock D. et al. 1988. Big Brother: A Network Services Expert. (*Expert Systems* 245–250) (1989).

Marques, T.E. 1988. A Symptom–Driven Expert System for Isolating and Correcting Network Faults. (*Expert Systems* 251–258)(1989).

Mathonet R. et al. 1987. DANTES: An Expert System for Real–Time Network Troubleshooting. (*Expert Systems* 259–262)(1989).

Callahan, P.H. 1988. Expert Systems for AT&T Switched Network Maintenance. (*Expert Systems* 263–273) (1989).

Quinlan, J.R., Learning Efficient Classification Procedures and Their Application to Chess End Games. In *Machine Learning An Artificial Intelligence Approach*, ed. Ryzard S. Michalski, 463–482. Palo Alto, CA: Tioga Publishing Co., (1983).

Goyal, S.K. Knowledge Technologies for Evolving Networks. In *Integrated Network Management*, II, ed. Iyengar Krishnan, 439–461. North–Holland: Elsevier Science Publishers B.V., 1991.

Nance, Barry, LAN Analyzers Move to AI. In *Byte*, One Phoenix Mill Lane, Peterborough, NH 03458, Mar. 1992, pp. 287–290.

Slade, S. Case–Based Reasoning: A Research Paradigm. In *AI Magazine*, Spring 1991, pp. 42–55.

Simoudis, E. Using Case–Based Retrieval for Customer Technical Support. In *IEEE Expert*, Oct. 1992, pp. 7–12.

Rumelhart, D.E. Learning Internal Representations by Error Propagation. In *Parallel Distributed Processing Explorations in the Microstructure of Cognition*, ed. David E. Rumelhart, 319–362. Cambridge, MA: The MIT Press, 1986.

Product brochure, Remedy Corporation, 1965 Landings Drive, Mountain View, CA 94043 (1992).

C. C. Lee, Fuzzy Logic . . . Systems:Fuzzy Logic Controller—Part I/II pp. 404–435, IEEE Transactions on Systems, Man and Cybernetics (Mar./Apr. 1990).

L. A. Zadeh, Outline of a New Approach to the Analysis of Complex Systems and Decision Processes, 1972, pp. 106–146, Reprinted from IEEE Trans. Systems, Man, an Cybernetics, SMC–3(1973), pp. 28–44.

E. Cox, Fuzzy Fundamentals, Advanced Technology/Circuits, pp. 58–61 w/cover, IEEE Spectrum (Oct. 1992).

D. G. Schwartz, et al, Fuzzy Logic Flowers in Japan, Applications/Control, pp. 32–35 w/cover, IEEE Spectrum (Jul. 1992).

D. I. Brubaker, Fuzzy–Logic Basics: Intuitive Rules Replace Complex Math, EDN–Design Feature, Jun. 18, 1992, pp. 111–126, EDN.

E. Smalley, "Is OpenView for you? HP's OpenView network management system competes head–on with SunConnect's low–cost SunNet Manager—Is there an Obvious choice?", *HP Professional*, vol. 6 No. 12, (Dec. 1992), p. 22(5).

Computer Select—Software Product Specification for Spectrum (Rel. 3.0) 1994.

S. Chiu and M. Togai, "A Fuzzy Logic Programming Environment for Real–Time Control," Int'l. J. of Approximate Reasoning, 2, 163–175. 1988.

Y. Tanaka et al., "Revenue Maximization Control of a Communication Network by the Use of Hierarchical Fuzzy System," Electronics and Communications in Japan, Part 1, vol. 1(4), pp. 56–66. Apr. 1991.

METHOD AND APPARATUS FOR MONITORING AND CONTROLLING COMMUNICATIONS NETWORKS

This application is a continuation of application Ser. No. 08/124,234, filed Sep. 20, 1993 now abandoned.

BACKGROUND OF THE INVENTION

1. Field of the Invention

The present invention relates generally to communications networks, and in particular to a method and apparatus for monitoring and controlling such networks. Within this disclosure, the term "communications network" is used to refer to any type of digital communications system, of which a computer-based, local area network or a computer-based, wide area network are examples.

2. Discussion of the Related Art

All communications networks require monitoring (of network performance) and control (of network parameters) of network operation. In small stable homogeneous communications networks (i.e., those in which all of the equipment is provided by the same vendor and the network configuration does not change), monitoring and control of the network is relatively straightforward. However, as a communications network becomes increasingly large and heterogeneous (i.e., those in which different types of equipment are connected together over large areas, such as an entire country), monitoring and control becomes more difficult.

To enhance monitoring and control of communications networks, artificial intelligence systems may be used. In existing systems that make use of artificial intelligence in this manner, monitoring and control expertise may be represented using a rule-based reasoning (hereinafter RBR) method.

A typical RBR system (also called an expert system or blackboard system) includes a working memory, a rule-base, and a control procedure. The working memory typically contains a representation of characteristics of the network, including topological and state information. The rule-base represents knowledge about what operations should be performed to control the network. If the network enters an undesirable state, the control procedure selects those rules that are applicable to the current situation. Of the rules that are applicable, a predetermined control strategy selects a rule to be executed. A rule can perform tests on the network, query a database, provide commands to a network configuration management system, or invoke another expert system. Using results obtained after executing a rule, the system updates the working memory by asserting, modifying, or removing working memory elements. The RBR system continues in this cycle until a desirable state in the working memory representing a desirable state of the network is achieved. Examples of RBR systems for network management may be seen in *Expert Systems Applications in Integrated Network Management*, edited by E. Erickson, L. Ericson, D. Minoli and published by Archtech House, Inc., 1989.

Constructing an RBR network monitoring and control system requires defining a description language that appropriately and completely represents networking conditions (the "domain"), extracting expertise from persons with expertise in the network ("domain experts") and/or troubleshooting documents, and representing the expertise in the RBR format. This procedure requires several iterations of a so-called "consult/implement/test" cycle in order to achieve a correct system. In the consult/implement/test cycle, an expert is interviewed to determine his or her control methodology, the methodology is implemented in a rule or rules that the system can process, and the rules are tested. If the conditions or domain in which the RBR system operates remains relatively stable, once a correct system is achieved, minimal maintenance is required. However, if the system is used to monitor and control in unpredictable or rapidly changing domains, two problems typically occur. First, the RBR system suffers from the problem of "brittleness". Brittleness means that the system fails when it is presented with a novel problem for which it has no applicable rules. A cause of system brittleness is that the system cannot adapt existing knowledge to a novel situation or Cannot gain new information from novel experiences to apply in the future. The second problem is commonly known as a "knowledge acquisition bottleneck". The knowledge acquisition bottleneck occurs when a knowledge engineer tries to manually modify the rule-base by devising special rules and control procedures in order to deal with changes, new parameters, or other unforeseen situations. As a result of these modifications, the RBR system typically becomes unwieldy, unpredictable, and unmaintainable. Furthermore, if the domain in which the RBR system operates is a rapidly changing one, the system can become obsolete in a relatively short period of time.

Another problem with RBR systems is that they use so-called "crisp logic". This means that the variables upon which decisions concerning system operations are made have only two values, "true" or "false". There are no other possibilities in "crisp logic" systems.

Figure 1:
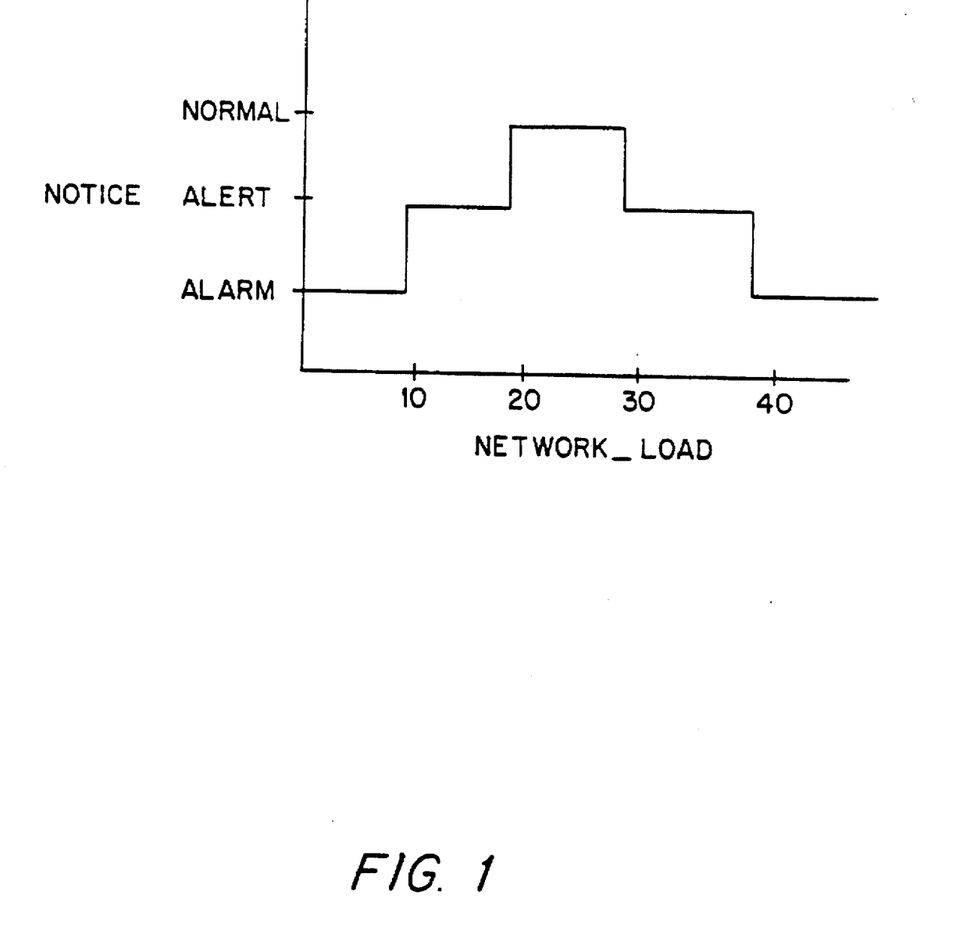
FIG. 1 is a graph illustrating the relationship between the numeric values of the variable network_load parameters and the type of notice issued in accordance with so-called crisp logic.

For example, consider the following simple function that describes a set of rules for issuing notices about the load of a network:

$$\text{notice} = \begin{cases} \text{alarm if network\_load} \leq 10\% \\ \text{alert if } 10\% < \text{network\_load} \leq 20\% \\ \text{normal if } 20\% < \text{network\_load} \leq 30\% \\ \text{alert if } 30\% < \text{networdk\_load} \leq 40\% \\ \text{alarm if network\_load} > 40\% \end{cases}$$

This approach is also called a "thresholding approach".

This set of rules is represented graphically in FIG. 1. For this set of rules, there are two working memory elements, network_load and notice, that is updated by a network monitor. The value of network_load is compared to the rules at predetermined time increments and one of the rules "fires" (that is, executes in response to the value of the variable network_load) to issue a notice. Note that a value of network_load=9.99 issues an alarm and a value of 10.01 issues an alert, whereas the values of 10.01 and 19.99 both issue an alert. In some cases, the reading of a value along an interval of length 0.02 could be significant, whereas in other cases the reading of a value along an interval of length 9.98 makes no difference. This is so because the rule set that describes the notice function is discontinuous and must be discontinuous if it is to be implemented in crisp logic.

The lack of continuity of a rule set is problematic for a number variables that represent network parameters. One of the reasons is because the rules are brittle. The antecedent (the "if" part) of a rule must be either true or false for the rule to be activated. Additionally, only one rule can fire at any one time since the ranges over which the individual rules fine are mutually exclusive. One approach to circumventing the brittleness problem is to add more rules. However, this approach is likely to result in a proliferation of rules, and thus causes the knowledge acquisition bottleneck problem.

Furthermore, crisp logic does not allow for any states of a variable other than true or false. Therefore, in the rule set illustrated in FIG. 1, a small change in the value of network_load can immediately cause the system to issue an alarm notice instead of an alert notice. This does not allow a user, who may be monitoring the operation of the network any flexibility in ascertaining whether or not the system is approaching an undesirable state.

Therefore, an object of the present invention is to provide a method and apparatus for monitoring and control of communications networks that provides a more flexible approach than the prior art.

Another object of the present invention is to provide a method and apparatus for monitoring and control of communications networks that processes data using fuzzy logic.

SUMMARY OF THE INVENTION

The present invention overcomes the disadvantages of the prior art by providing an improved method and apparatus for monitoring and controlling a communications network. The apparatus includes a network monitor coupled to the communications network and providing numeric data representative of at least one operating parameter of the communications network. A fuzzifier module is coupled to the network monitor and converts the numeric data into fuzzy input data. A fuzzy inference engine is coupled to the fuzzifier module and processes the fuzzy input data according to at least one fuzzy rule to provide fuzzy output data representative of control actions to effect a desired state of the communications network. A defuzzifier module may be coupled to the fuzzy inference engine and converts the fuzzy output data into numeric data which may be then used by a network controller to control at least one network parameter in accordance with the output data. The apparatus may also include a user interface and a display to allow the fuzzy input data and/or the fuzzy output data to be displayed to a user. Using the user interface, the user can then modify the fuzzy input data and/or the fuzzy rules before the data is processed by the fuzzy inference engine. Also using the user interface, the user can modify the fuzzy output data before that data is defuzzified.

In one embodiment of the invention, the apparatus automatically monitors network operational parameters, processes fuzzy input data representative of the operational parameters using fuzzy logic to provide fuzzy output data that is used to control the operation of the network by adjusting network controller parameters.

In another embodiment, the invention monitors at least one operating parameter of the network provided in a numeric data format, converts the numeric data to fuzzy input data, and displays the fuzzy input data to a user.

The invention also provides a method for monitoring and controlling a communications network including the steps of receiving numeric data representative of at least one operating parameter of the communications network from a network monitor, converting the numeric data representative of at least one operating parameter into fuzzy input data, processing the fuzzy input data according to at least one fuzzy rule to provide fuzzy output data representative of control actions to effect a desired state of the communications network, converting the fuzzy output data into numeric data, and controlling at least one network parameter in response thereto. The method also allows a user to modify the fuzzy input data and the fuzzy rules in order to provide additional input for control of the communications network.

The invention also provides a methodology for designing membership functions and fuzzy rules useful for monitoring and control of communications networks. The system provides for reporting of network behavior in common sense terms, providing recommendations to a user regarding network operational parameters, and, in one embodiment, complete automatic monitoring and control of network operational parameters.

The features and advantages of the present invention will be more readily understood and apparent from the following detailed description of the invention, which should be read in conjunction with the accompanying drawings, and from the claims which are appended at the end of the detailed description.

BRIEF DESCRIPTION OF THE DRAWINGS

In the drawings, which are incorporated herein by reference and in which like elements have been given like reference characters.

DETAILED DESCRIPTION

For purposes of illustration only, and not to limit generality, the present invention will now be explained with reference to its use in monitoring and controlling a typical computer-based local area network. However, one skilled in the art will recognize that the present invention is applicable to other types of communications networks. Additionally and alternatively, the present invention may be used as a control system in a single device coupled to the communications network.

Figure 2:
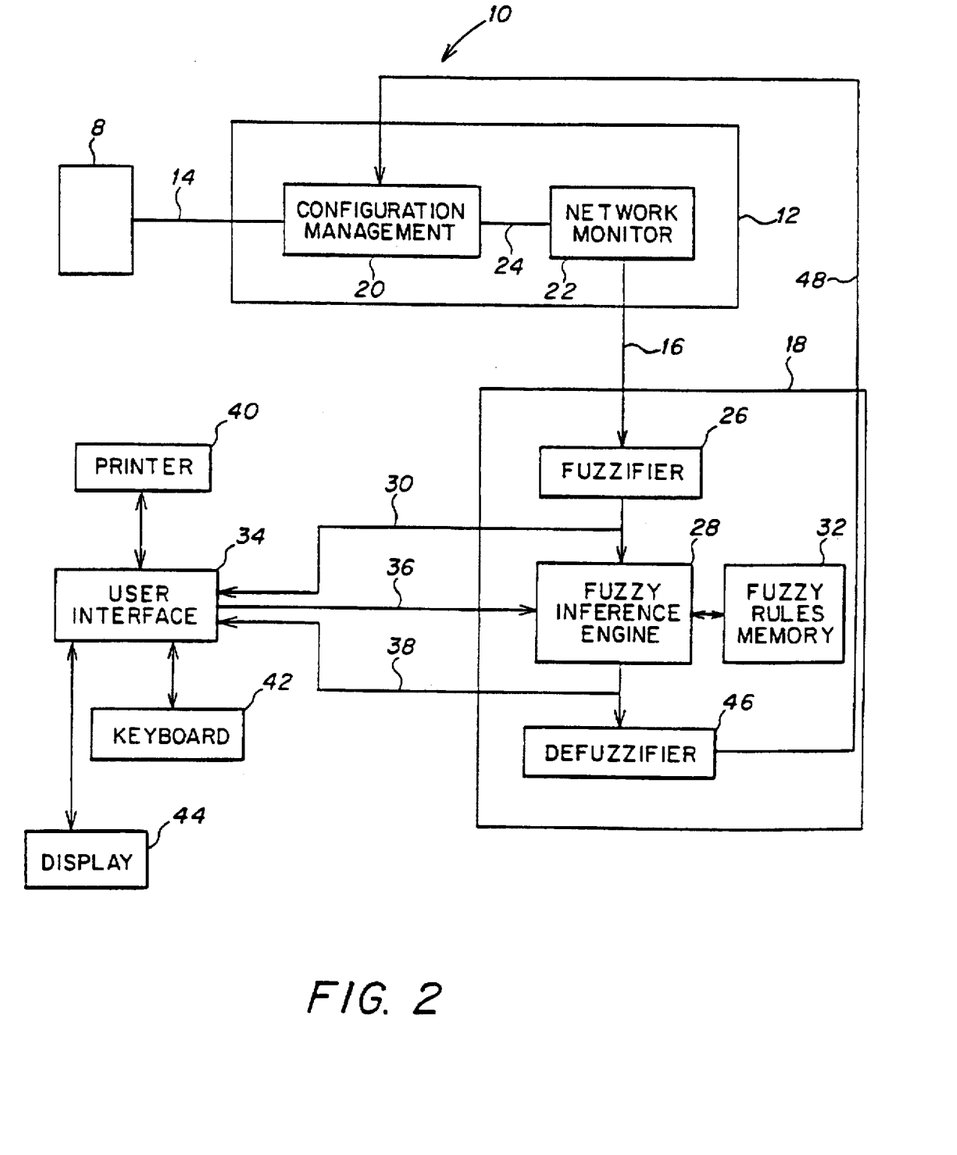
FIG. 2 is a block diagram of a monitoring and control system of the present invention.

FIG. 2 is an overall block diagram of a communications network monitoring and controlling system 10 which incorporates the present invention. The system includes a network monitoring system 12 that is coupled via communications link 14 to a local area network 8. Network monitoring system 12 is coupled, via communications link 16 to a fuzzy logic control system 18. By "communications link" is meant any type of software/hardware data transmission/reception medium.

In one embodiment, network monitoring system 12 may be the SPECTRUM™ local area network monitoring system manufactured by Cabletron Systems, Inc., Rochester, N.H. The SPECTRUM™ system is described in copending and commonly owned application Ser. No. 07/583,509 entitled NETWORK MANAGEMENT SYSTEM USING MODEL-BASED INTELLIGENCE filed Sep. 17, 1990; Ser. No.

07/789,000 entitled NETWORK MANAGEMENT SYSTEM USING STATUS SUPPRESSION TO ISOLATE NETWORK FAULTS filed Nov. 7, 1991; Ser. No. 07/790, 408 entitled NETWORK MANAGEMENT SYSTEM USING INTERCONNECTED HIERARCHIES TO REPRESENT DIFFERENT DIMENSIONS filed Nov. 7, 1991; Ser. No. 07/788,936 entitled NETWORK MANAGEMENT SYSTEM USING MULTIFUNCTION ICONS filed Nov. 7, 1991; Ser. No. 07/797,121 entitled METHOD AND APPARATUS FOR MONITORING THE STATUS OF NON-POLABLE DEVICES IN A COMPUTER NETWORK filed Nov. 22, 1991, which are hereby incorporated by reference in their entirety.

In another embodiment, network monitoring system 12 may include the netsnoop utility of Silicon Graphics Netvisualizer to monitor and return raw network data.

Although SPECTRUM™ and Netvisualizer have been specifically mentioned, the present invention may be used to process data from any type of network monitoring system.

The network monitoring system 12 includes a configuration management module 20 and a network monitor module 22. Configuration management module 20 provides for monitoring and control of certain aspects of network operation, such as uploading or downloading software, allocating memory, and network organization. Configuration management module 20 also receives operational parameters and executes control parameters of the network. Network monitor module 22 monitors local area network 8 via communications link 14, configuration management module 20, and communications link 24 to detect changes in network operation parameters and to effect control of the network. Network monitor 22 automatically gathers and transmits information concerning network operation parameters via communications link 16 to fuzzy logic control system 18.

Fuzzy logic control system 18 includes a fuzzifier module 26 that receives values of monitored network parameters in the form of numeric data and translates this numeric data into terms of a description language to provide fuzzy input data. The fuzzy input data from fuzzifier module 26 is transmitted to fuzzy inference engine 28 via communications link 30. Fuzzy inference engine 28 processes the fuzzy input data in accordance with at least one fuzzy rule stored in a fuzzy rule memory 32 to provide fuzzy output data that may be used to control the parameters of communications network 8. Unlike the RBR approach, in the fuzzy inference engine, all fuzzy rules in fuzzy rule's memory 32 that participate in the "truth" of the fuzzy input data will fire and thus contribute to the overall solution.

As an alternative, or in addition to the automatic process, the fuzzy input data from fuzzifier 26 may be transmitted via communications link 30 to user interface module 34. User interface module 34 allows a user to view (on display 44), edit and control the fuzzy input data and the operations of fuzzy inference engine 28. In addition, communications link 38 can transmit the fuzzy output data to user interface 34 so that a user can view (on display 44) the proposed solutions before they are implemented on communications network 8.

Printer 40 allows permanent recording, as well as data logging and other operations. Keyboard 42 allows a user to modify the fuzzy input data, the fuzzy output data and the fuzzy rules used by inference engine 28.

Once appropriate fuzzy output data has been generated by fuzzy inference engine 28, this data is transmitted via communications link 38 to defuzzifier module 46. Defuzzifier module 46 converts the fuzzy output data back into numeric data, i.e., back into a suitable form to be executed by a network controller. The numeric data is then transmitted via communications link 48 to configuration management module 20, for use in controlling network 8.

The functions carried out by fuzzy logic control system 18 may be implemented by programming a general purpose computer as will be described in greater detail. The general purpose computer may be the network file server, a client workstation attached to the network, or a workstation dedicated to use by maintenance and repair personnel. Alternatively, the functions carried out by fuzzy logic control system 18 may be implemented in special purpose hardware or a special purpose integrated circuit.

Fuzzy logic control systems are known in the art. There are many references that describe fuzzy logic concepts and systems. Three such references are E. Cox, *Fuzzy Fundamentals;* Advanced Technology/Circuits, IEEE Spectrum, Oct. 1992, pp. 58–61; D. Schwartz, *Fuzzy Logic Flowers in Japan;* Applications/Control, IEEE Spectrum, Jul. 1992, pp. 32–35; and D. Brubaker, *Fuzzy-Logic Basics: Intuitive Rules Replace Complex Math;* EDN-Design Feature, EDN, Jun. 18, 1992, pp. 111–127, which are incorporated herein by reference.

To operate the fuzzy logic control system 18, one begins by defining a description language that describes network behavior. The description language is a formal language having a predetermined syntax that represents networking conditions and control actions (the "domain"). The description language includes a number of linguistic variables. Linguistic variables are variables that use linguistic values rather than numeric values to describe the magnitude of the linguistic variable. An example of a linguistic variable is the variable network_load. In numeric terms, this variable has values from 0 to 100% that represent the amount of network usage. In linguistic terms, this variable has linguistic values of light, normal, and heavy that represent the amount of network usage. Linguistic variables may be input variables that represent the present state of the network or output variables that are varied in order to control the communications network. The description language describes items such as input variables from network monitoring and control system 12, input variables that represent network behavior as perceived by users, and output variables that describe changes to network parameters.

Once a description language has been developed, membership functions that translate the numeric values of network parameters into degrees of membership in a fuzzy set are specified. A membership function translates the numeric value of a variable into a linguistic value and provides a weighting function that describes the degree to which a particular numeric value participates in a linguistic value. This is known as fuzzifying or fuzzification. Membership functions are processed in fuzzifier module 26. Next, resolution strategies are defined by, for example, extracting expertise from domain experts or other sources. Resolution strategies are fuzzy rules that connect input variables and output variables. Fuzzy rules provide network control solutions in response to the states of the fuzzy input variables. Fuzzy rules are processed in fuzzy inference engine 28. Finally, a defuzzification strategy is determined that maps the linguistic values of the fuzzy output data back into numeric data for use by configuration management module 20. Defuzzification is provided by defuzzifier module 46.

Figure 3A:
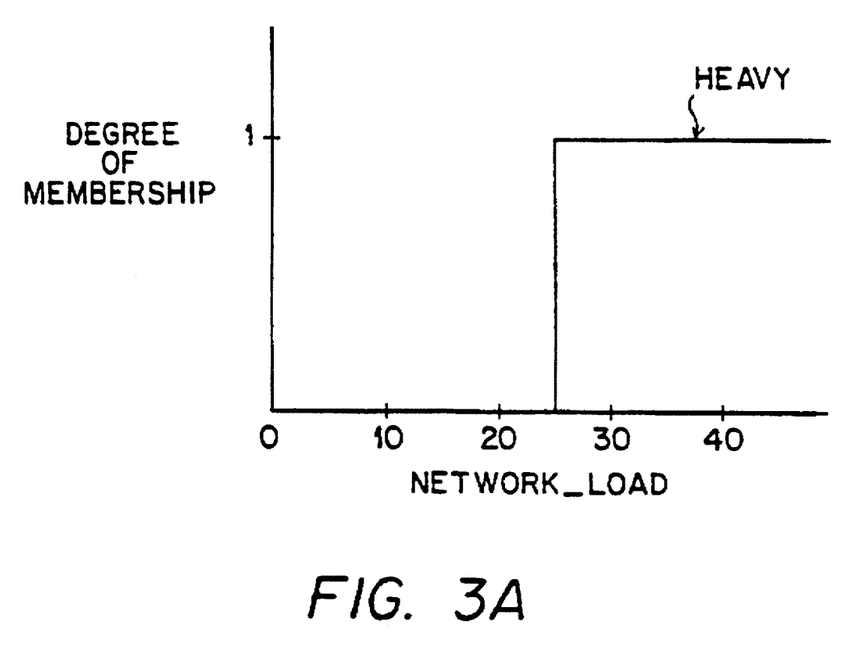
FIG. 3A is a graph illustrating the degree of membership of the numeric values of the variable network_load in the linguistic value heavy of the variable network_load according to crisp logic.

An example will illustrate how membership functions and fuzzy rules are designed according to the present invention. FIG. 3A illustrates the linguistic value of "heavy" for the network variable network_load in crisp logic. As illustrated in FIG. 3A, the value of network_load has a degree of membership of 0 in the value heavy for network_loads from 0 to 25% of capacity. As soon as the value of network_load is greater than 25%, the degree of membership becomes one. Stated another way, there are only two possibilities "heavy" and "not heavy". Network loads of less than 25% are not heavy and have a degree of membership of 0 in the linguistic value heavy. In the same manner, network loads of 25% or greater are heavy and have a degree of membership of one in the linguistic value of heavy.

The possible values of the variable network load extend over the interval 0, 100%. With the fuzzy logic framework, a fuzzy set representing at least one membership function describing the degree of membership of the numeric values of the network load in the linguistic value heavy is defined as follows:

$$heavy = \begin{cases} 0.0 \text{ for } 0 \leq y \leq 25 \\ 1.0 \text{ for } y \geq 50 \\ (y*4) - 1 \text{ otherwise} \end{cases} \quad (1)$$

Figure 3B:
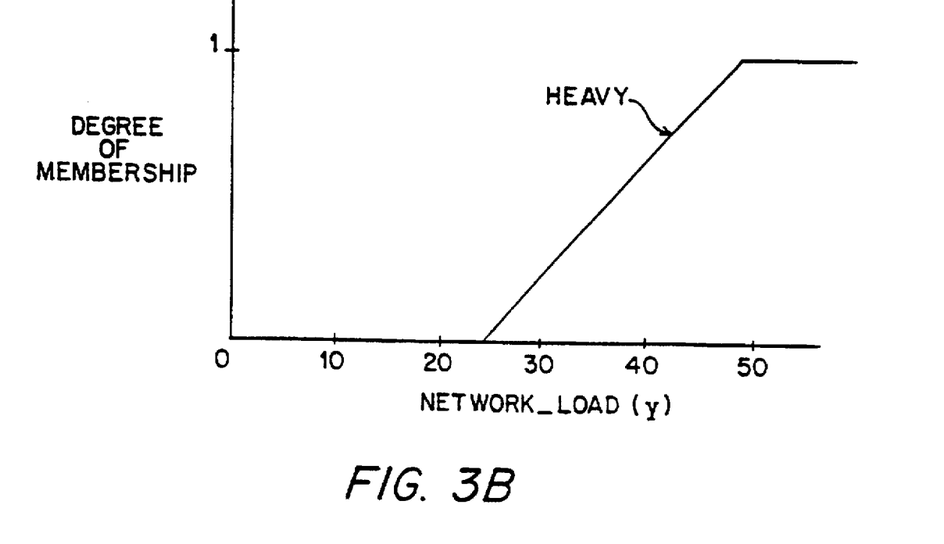
FIG. 3B is a graph illustrating the degree of membership of the numeric values of the variable network_load in the linguistic value heavy of the variable network_load according to fuzzy logic.

FIG. 3B illustrates this fuzzy logic membership function. This function more appropriately describes what the value "heavy" means to a network user. As can be seen in FIG. 3B, as the numeric value of network_load increases, the degree of membership that of that value in the linguistic value of heavy increases according to membership function (1). A numeric value of network_load of less than 25% has a 0.0 degree of membership in the linguistic value heavy, a numeric value of 30 has a 0.2 degree of membership, and a numeric value of 40 has a 0.6 degree of membership.

Using this framework, other membership functions can be designed. For example, in the fuzzy logic framework, the linguistic value of a "light" network_load may be defined as follows:

$$light = \begin{cases} 0.0 \text{ for } y \geq 25 \\ 1 - (y*4) \text{ otherwise} \end{cases} \quad (2)$$

As another example, in the fuzzy logic framework, the linguistic value of "normal" network_load may be defined as follows:

$$normal = \begin{cases} 0.0 \text{ for } y \leq 15 \text{ or } y \geq 35 \\ 1 - (|y - .25|*10) \text{ otherwise} \end{cases} \quad (3)$$

Figure 3C:
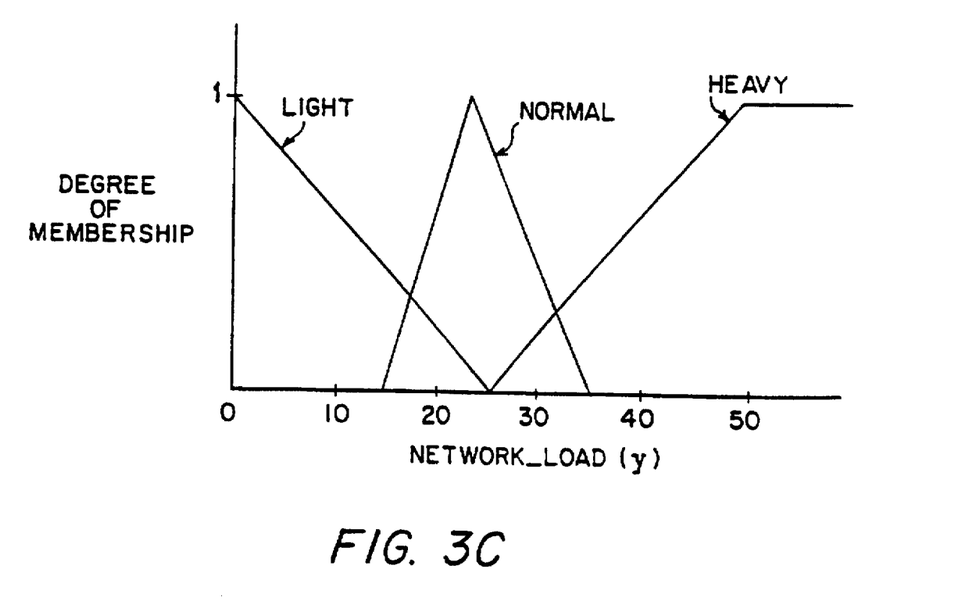
FIG. 3C is a graph illustrating the degree of membership of the numeric values of the variable network_load in the linguistic values of light, normal, and heavy of the variable network_load according to fuzzy logic.

FIG. 3C is a graph illustrating membership functions (1), (2), and (3). In particular, FIG. 3C illustrates the relationship between numeric values of the variable network load and the degree of membership in each of the linguistic values of light, normal, and heavy. One skilled in the art will appreciate that as occurs in everyday experience, there is a degree of overlap among these different linguistic values. For example, a numeric value of 30% has a 0.5 degree of membership in the linguistic value normal and a 0.2 degree of membership in the linguistic value heavy. Therefore, fuzzy inference engine 28 may invoke a number of fuzzy rules associated with each of these linguistic values when determining the values of fuzzy output variables.

Although linear functions have been illustrated, membership functions can also be nonlinear functions.

In the same manner, one can define membership functions for linguistic values of variables representing network monitoring system 12, such as packet_collision_rate, packet transmission_rate, packet_deferment_rate, and channel acquisition_time, (ii) membership functions for linguistic values of variables representing other input variables that represent network behavior as perceived by users such as slow file_transfer_throughput and command_execution_response_time, and (iii) membership functions for linguistic values of variables representing output variables such as notices, network_load adjustment, and transmit_buffer_time_adjustment.

Once the membership functions have been defined, resolution strategies, i.e., fuzzy rules are defined that connect fuzzy input variables and fuzzy output variables. Example fuzzy rules are:

(4) If network_load is heavy and file_transfer_throughput is slow then bandwidth_adjustment is small increase.

(5) If network_load is not heavy and packet_collision_rate is high then transmit_buffer_timer_adjustment is small increase.

(6) If network_load is very heavy then notice is strong alert and reroute % is medium decrease.

(7) If network_load is normal and rate_of_load_change is high increase then notice is alert and reroute % is small decrease.

The fuzzy rules are stored in fuzzy rules memory 32 and used by fuzzy inference engine 28 to operate on the linguistic values of the input variables, for example, light, normal, and heavy of the network variable network_load.

Using the principles described, a complete fuzzy rule set for the communications network can be developed.

Figure 4:
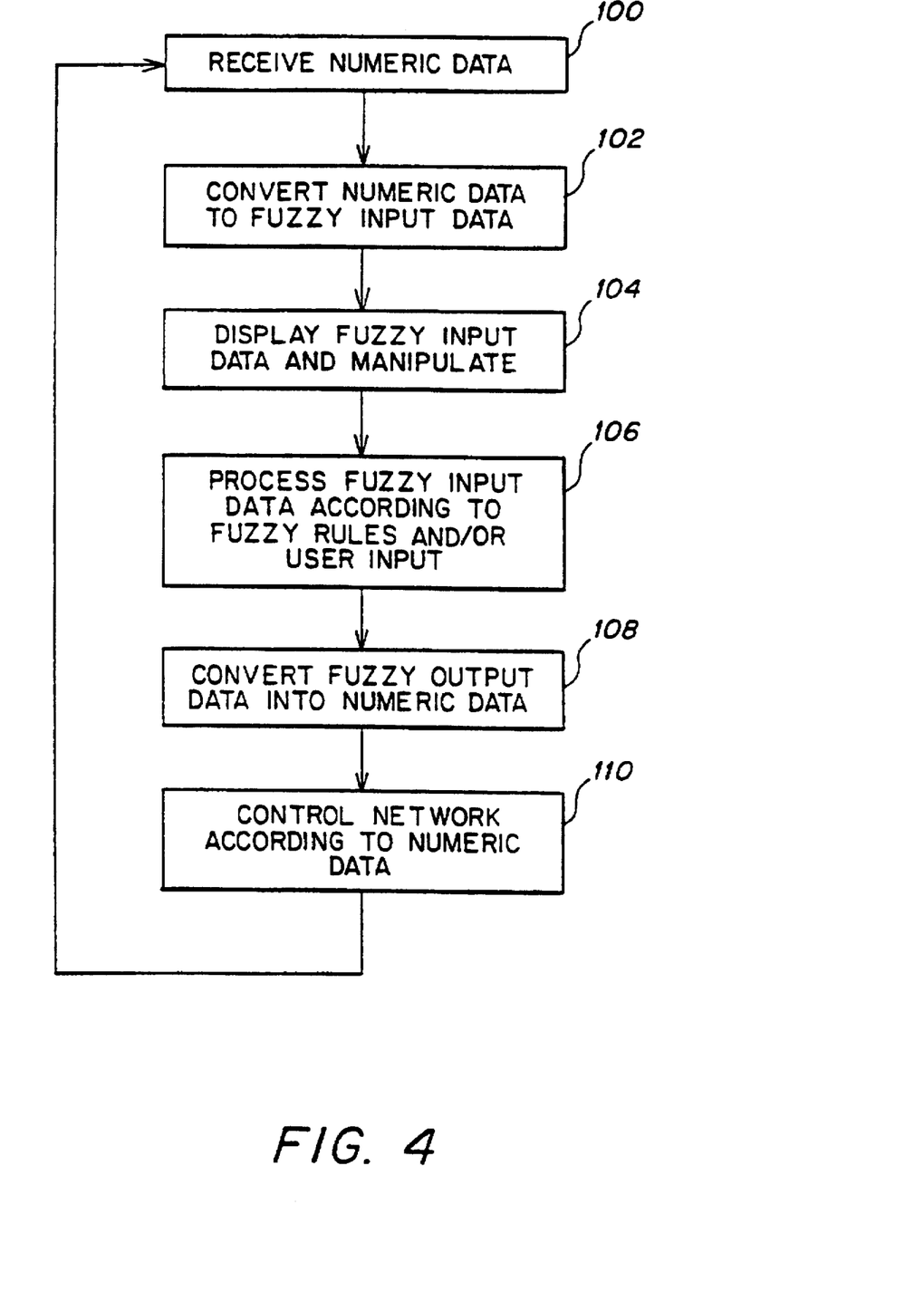
FIG. 4 is a flow chart illustrating the processing steps carried out by the fuzzy logic controller illustrated in FIG. 2.

FIG. 4 illustrates the method of monitoring and control according to the invention. The method begins in step 100 in which numeric data is received by fuzzy logic control system 18 from network monitoring system 12. From step 100, the system proceeds to step 102 in which the numeric data is converted into fuzzy input data using, for example, fuzzifier module 26. From step 102, the system proceeds to step 104 in which the fuzzy input data is displayed to a user and manipulated if desired. Step 104 is optional and a system may be designed that automatically monitors network parameters and applies fuzzy logic to control the network. From step 104, the system proceeds to step 106 in which the fuzzy input data is processed according to the stored fuzzy rules and/or input from a user to provide fuzzy output data using, for example, fuzzy inference engine 28. In step 106, all rules that participate in the "truth" of the input data will fire and contribute to the overall solution. From step 106, the system proceeds to step 108 in which the fuzzy output data is converted back into numeric data using, for example, defuzzifier module 46. From step 108, the system proceeds to step 110 in which the operational parameters of the communications network are adjusted in accordance with the numeric data from defuzzifier module 46. From step 110, the method proceeds to step 100 and continues as already previously described.

The present invention may be advantageously used to report network operational conditions in common sense terms that can be easily understood by a user. In addition, the system can be used to generate reports and performance statistics about network operation in accordance with, for example, method steps 100, 102, 104. The system can also be used to make recommendations for solutions that can be displayed to a user and modified if the user desires in accordance with, for example, method steps 100–106.

Example fuzzy rules that may be used to monitor and control a communications network have been described. One skilled in the art will recognize that a wide variety of membership functions and fuzzy rules can be designed in accordance with the concepts of the present invention.

Fuzzy inference engine 28, may be designed using the compositional rule of inference described in C. Lee, *Fuzzy Logic in Control Systems; Fuzzy Logic Controller (Parts I and II)*; IEEE Transactions on Systems, Man, and Cybernetics. Vol. 20, No. 2, Mar./Apr. 1990. pp. 404–435. and L. Zadeh, *Outline of a New Approach to the Analysis of Complex Systems and Decision Processes*, IEEE Transactions on Systems, Man, and Cybernetics, SMC-3. 1973. pp. 28–44. Fuzzifier module 26 and defuzzifier module 46 may also be designed in accordance with the techniques described in these two references.

Some advantages of the fuzzy logic approach to monitoring and control of communications networks are that numeric network data is represented in understandable common sense terms, a fuzzy rule does not have to be a perfect match with the input data in order to contribute to a solution, the implementation of knowledge is intuitive, and there is a sound mathematical underpinning for the system.

Having thus described one particular embodiment of the invention, various alterations, modifications, and improvements will readily occur to those skilled in the art. Such alterations, modifications, and improvements are intended to be part of this disclosure, and are intended to be within the spirit and scope of the invention. Accordingly, the foregoing description is by way of example only and is not intending as limiting. The invention is limited only as defined in the following claims and the equivalents thereto.

What is claimed is:

1. An apparatus for monitoring and controlling a communications network, comprising:
   a separate network monitor and controller, coupled to the communications network, providing numeric data representative of at least one operating parameter of the communications network and controlling at least one network parameter;
   a separate system that requires only fuzzy logic operations to control the communications network, comprising:
      a fuzzifier module, coupled to the network monitor, converting the numeric data into fuzzy input data;
      a fuzzy inference engine, coupled to the fuzzifier module, for processing the fuzzy input data according to at least one fuzzy rule to provide fuzzy output data representative of control actions that effect a desired state of the communications network;
      a defuzzifier module, coupled to the fuzzy inference engine, converting the fuzzy output data into numeric data for the separate network monitor and controller to control at least one network parameter in response thereto; and
      an operator interface allowing user observation of the fuzzy input data and the fuzzy output data, and user modification of said at least one fuzzy rule before converting the fuzzy output data into the numeric data to modify said fuzzy logic operations performed by said fuzzy inference engine during said control of the communications network.

2. The apparatus of claim 1, wherein the fuzzy input data comprises at least one linguistic variable.

3. The apparatus of claim 2, wherein the fuzzifier module converts the numeric data into fuzzy input data using at least one membership function.

4. The apparatus of claim 3, wherein the membership function additionally comprises a weighting function that describes the degree to which a particular numeric value participates in a linguistic variable.

5. The apparatus of claim 4, wherein there are at least two membership functions for each linguistic variable and wherein each membership function produces different fuzzy input data for identical numeric data.

6. The apparatus of claim 5, wherein the defuzzifier module converts the fuzzy output data into numeric data using at least one membership function.

7. A method for monitoring and controlling a communications network, comprising the steps of:
   receiving numeric data representative of at least one operating parameter of the communications network from a separate network monitor and controller;
   converting the numeric data representative of at least one operating parameter into fuzzy input data;
   processing the fuzzy input data according to at least one fuzzy rule to provide fuzzy output data representative of control actions that effect a desired state of the communications network;
   displaying at least one of the fuzzy input data and the fuzzy output data to a user;
   receiving user modifications of said at least one fuzzy rule;
   repeating said processing step with said at least one user-modified fuzzy rule to provide modified fuzzy output data;
   repeating said displaying step with said at least one the fuzzy input data and said modified fuzzy output data;
   converting said modified fuzzy output data into numeric data; and
   controlling at least one network parameter in response thereto;
   wherein the method uses only fuzzy logic operations to control the communications network.

8. The method of claim 2, wherein the fuzzy input data comprises at least one linguistic variable.

9. An apparatus for monitoring and controlling a communications network, comprising:
   means, including a separate network monitor and controller, for receiving numeric data representative of at least one operating parameter of the communications network;
   means including a separate system that requires only fuzzy logic operations to control the communications network, comprising:
      means for converting the numeric data representative of at least one operating parameter into fuzzy input data;
      means for processing the fuzzy input data according to at least one fuzzy rule to provide fuzzy output data representative of control actions that effect a desired state of the communications network;
      means for converting the fuzzy output data into numeric data for the separate network monitor and controller to control at least one network parameter in response thereto;
      means for displaying at least one of the fuzzy input data and the fuzzy output data to a user;
      means for incorporating user modifications of said at least one fuzzy rule into said processing means before converting the fuzzy output data into the numeric data enabling the user to modify said fuzzy logic operations during said control of the communications network; and
      means for controlling at least one network parameter in response to the numeric data.

10. The method of claim 3, wherein the step of converting the numeric data into fuzzy input data includes the step of converting numeric data into fuzzy input data using at least one membership function.

11. The method of claim 10, wherein the membership function additionally comprises a weighting function that describes the degree to which a particular numeric value participates in a linguistic variable.

12. The method of claim 11, wherein the step of converting the numeric data into fuzzy input data includes the step of converting numeric data into fuzzy input data using at least two membership functions for each linguistic variable and wherein each membership function produces different fuzzy input data for identical numeric data.

13. The method of claim 12, wherein the step of converting the fuzzy output data into numeric data includes the step of converting the fuzzy output data into numeric data using at least one membership function.

14. The apparatus of claim 3, wherein the fuzzy input data comprises at least one linguistic variable.

15. The apparatus of claim 14, wherein the means for converting the numeric data into fuzzy input data includes means for converting the numeric data into fuzzy input data using at least one membership function.

16. The apparatus of claim 15, wherein the membership function additionally comprises a weighting function that describes the degree to which a particular numeric value participates in a linguistic variable.

17. The apparatus of claim 16, wherein there are at least two membership functions for each linguistic variable and wherein each membership function produces different fuzzy input data for identical numeric data.

18. The apparatus of claim 17, wherein the means for converting the fuzzy output data into numeric data includes means for converting the fuzzy output data into numeric data using at least one membership function.

\* \* \* \* \*